(No Model.) 2 Sheets—Sheet 2.

A. L. EMERY.
FILTER.

No. 526,695. Patented Oct. 2, 1894.

Witnesses:
Wm. J. Sankey.
L. L. Tracey.

Inventor
Avery L. Emery.
By Higdon & Higdon & Longan
Attorneys.

UNITED STATES PATENT OFFICE.

AVERY L. EMERY, OF ST. LOUIS, MISSOURI, ASSIGNOR TO THE GRANITE FILTER COMPANY, OF SAME PLACE.

FILTER.

SPECIFICATION forming part of Letters Patent No. 526,695, dated October 2, 1894.

Application filed September 11, 1893. Serial No. 485,221. (No model.)

*To all whom it may concern:*

Be it known that I, AVERY L. EMERY, of St. Louis, State of Missouri, have invented certain new and useful Improvements in Filters, of which the following is a full, clear, and exact description, reference being had to the accompanying drawings, forming a part hereof.

My invention relates to an improved filter, and consists in the novel arrangement, combination and construction of parts as will be more fully hereinafter described and designated in the claim.

Figure 1:
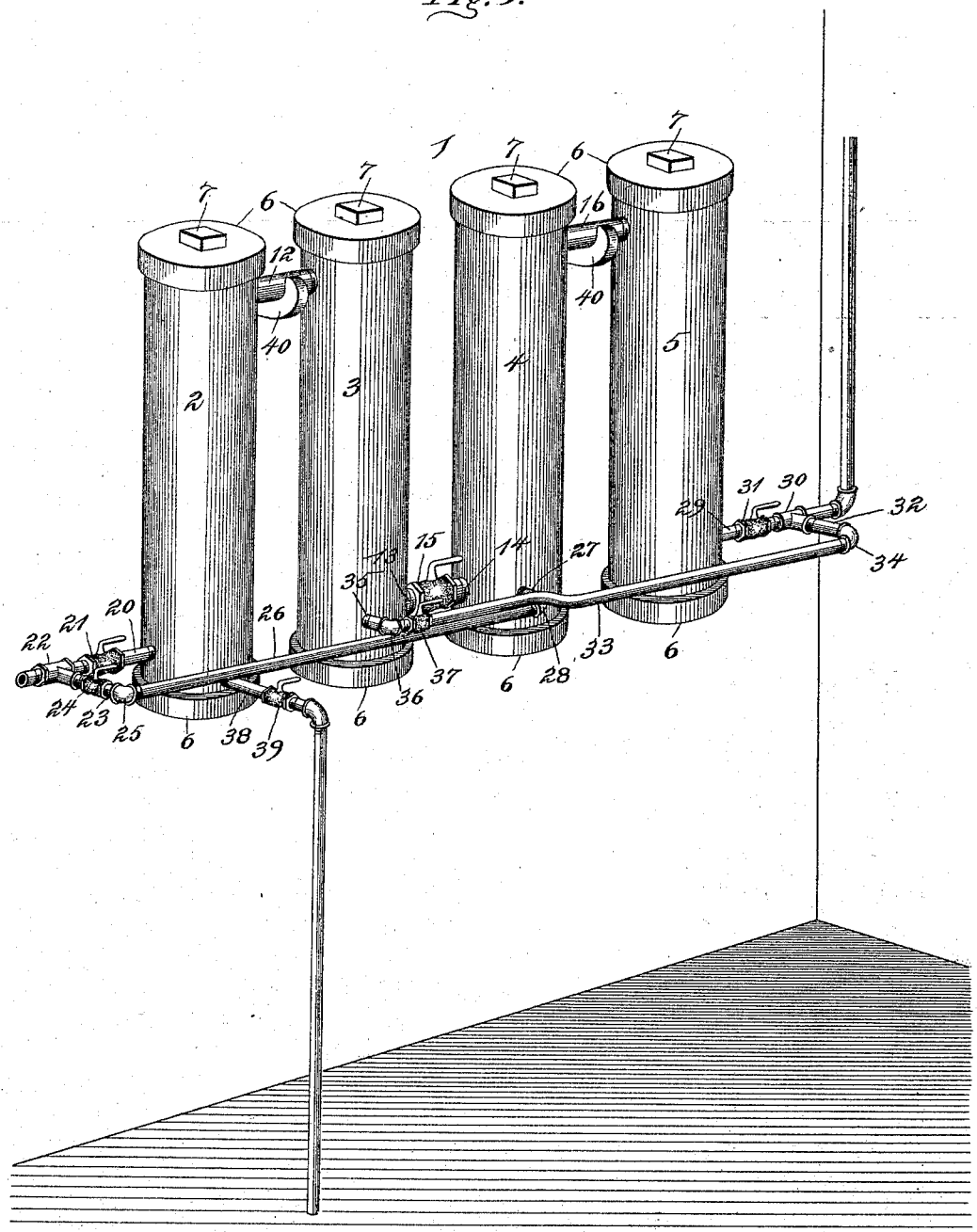
Figure 2:
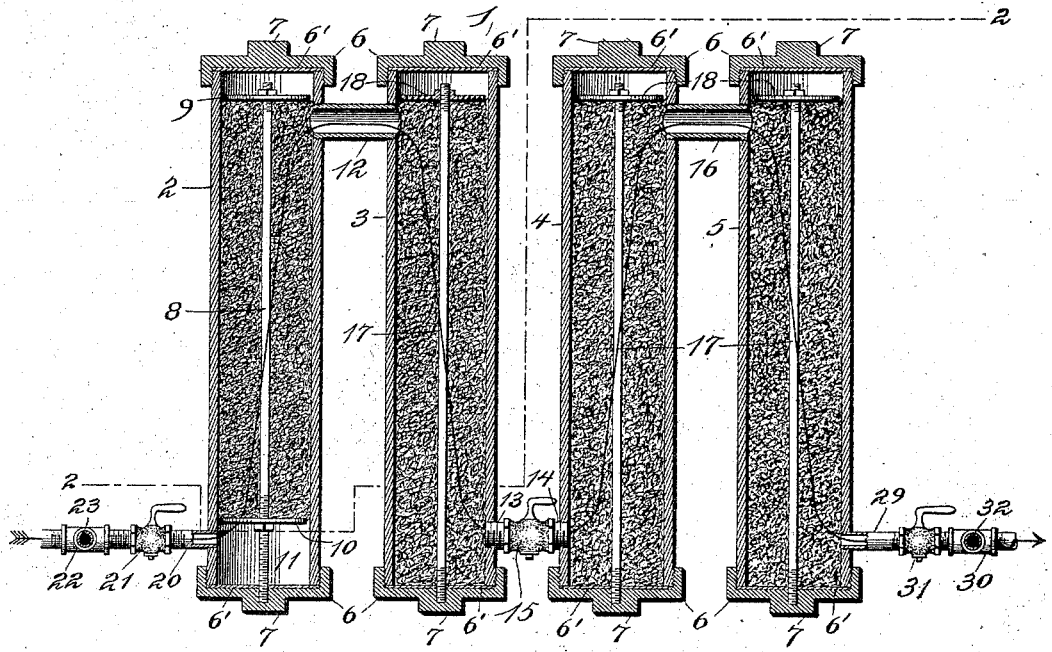
Figure 3:
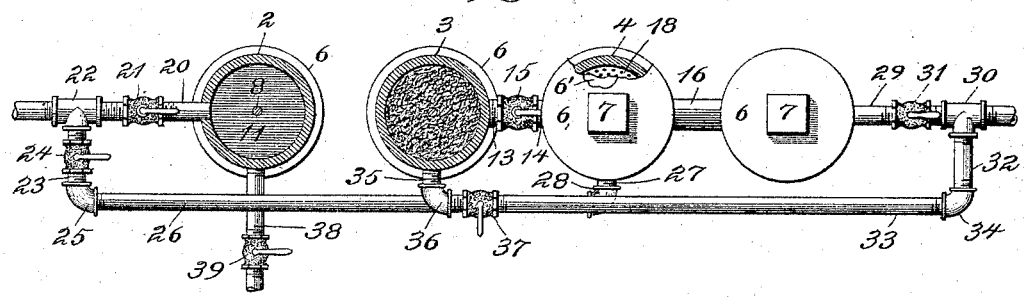

In the drawings: Figure 1 is a perspective view of my improved filter. Fig. 2 is a vertical longitudinal central section of Fig. 1. Fig. 3 is a plan view of Fig. 1 portions being in section, said section taken on the line 2—2 of Fig. 2.

1 indicates my improved filter which is constructed of a series of vertical pipes, 2, 3, 4 and 5. Each end of these pipes is closed with a cap 6 and each of these caps is constructed with an angular projection 7 to allow a wrench to be applied for removing said caps.

Located between the ends of the vertical pipe and the cap 6 is a washer 6', which is the same in diameter as the pipes and when the cap is securely screwed on it will make the said pipes water tight, these caps being connected to the pipes by being screw threaded thereon.

Threaded into the cap 6 which covers the lower end of the pipe 2 and extending upward in said pipe is a rod 8, upon the upper portion of which is a horizontal perforated disk 9, it being connected to said rod by being threaded thereon or secured by a nut. Located on said rod a suitable distance above the lower end is a similar perforated disk 10. By its being so located it forms a chamber 11 in the lower end of the pipe 2.

The vertical pipe 2 is connected to the vertical pipe 3 by a short horizontal pipe 12 which is located adjacent their upper ends and threaded therein at a point below the disks 9 and 18 therein. The pipe 3 is connected to the pipe 4 by two short horizontal pipes 13 and 14. The pipe 14 is threaded into the pipe 4 adjacent its lower end and the pipe 13 is threaded into the pipe 3 so that the pipes 13 and 14 will be in alignment with each other, they being connected by a stop cock 15 which is of ordinary construction, the adjacent ends of said pipes being threaded into said stop cock.

The pipes 4 and 5 are connected by a short horizontal pipe 16 threaded through the adjacent sides of said pipe adjacent their upper ends at a point below the disks 18 therein. By the construction of these horizontal pipes the vertical pipes 2, 3, 4, and 5 are arranged in pairs, and the adjacent alternate ends of each pair are indirectly connected.

17 indicates a vertical rod. There being one of these rods located in each of the vertical pipes 3, 4, and 5 I will describe but one of them.

The vertical rod 17 has a length less than that of the pipe and is threaded into the cap 6 on the lower end of the vertical pipe and extends upward into said pipe and a perforated disk 18 is connected thereto adjacent the upper end of the vertical pipe. This disk is connected to the vertical rod by being threaded thereon.

The vertical pipes 2, 3, 4 and 5 are filled with a continuous and homogeneous body of filtering material 19 (which is known to the trade as "granite mineral wool") below the disks 9 and 18 and above the disk 10. I have found that when this wool becomes wet it will adhere to the sides of the pipes in which it is located so that water cannot pass up between the pipes and the wool.

Threaded into the lower end of the pipe 2 and opening into the chamber 11 is a horizontal inlet pipe 20, which is provided with a stop cock 21 located adjacent said pipe 2. Connected to the horizontal pipe 20 by a T-coupling 22 is a short horizontal pipe 23 which runs at right angles to the pipe 20 and is provided with a stop cock 24. Connected to the horizontal pipe 23 by an elbow coupling 25 is a horizontal pipe 26 which extends past the lower end of the vertical pipes 2 and 3 and is connected to the lower end of the vertical pipe 4 by a short horizontal pipe 27 being threaded therein and connected to the adjacent end of the pipe 26 by a coupling 28.

Connected to the lower end of the vertical pipe 5 is an outlet pipe 29 which is provided with a T-coupling 30 and a stop cock 31 which is located between said T-coupling and the pipe 5. Connected to the T-coupling is a pipe 32 which extends outward a suitable distance so that a pipe 33 can be connected by an elbow coupling 34 so that said pipe 33 will be in alignment with the pipe 26. The pipe 33 extends past the vertical pipes 4 and 5 and is connected to the lower end of the vertical pipe 3 by a short horizontal pipe 35 being connected to its adjacent end by an elbow coupling 36. The pipe 33 is constructed with a stop cock 37 adjacent the elbow coupling 36.

Connected to the lower end of the pipe 2 and opening into the chamber 11 is a waste pipe 38 which leads to a sewer or drain. This pipe is provided with a stop cock 39.

By the filter being constructed as hereinbefore described the horizontal pipes 12 and 16 can be made to engage hooks such as 40 which are connected to the side wall of a room and a suitable distance above the floor so that free access can be had for taking out the rods 8 and 17 for cleaning the filtering material.

The operation is as follows: When the stop cocks 24 and 37 are closed and the stop-cocks 21, 15 and 31 are open and water is forced in through the inlet pipe 20, it will go through the vertical pipes 2, 3, 4 and 5 as indicated by the arrow in Fig. 2. It can be readily seen that the filtering material in the vertical pipes 2 and 3 will catch the dirt and the filtering material in the pipes 3 and 4 will be clean. When it is desirous of cleaning the pipes 2 and 3 the operator closes the stop cocks 21 and 15 and opens the stop-cock 24, which will allow water to be carried past the pipes 2 and 3 by the pipe 26 and into the lower end of the pipe 4, the vertical pipes 4 and 5 being independent of the pipes 2 and 3. For cleaning the wool the operator removes the cap 6 from the lower end of the pipe 2 and draws the rod 8 which carries the disks 9 and 10 and the wool out. After the wool has been washed it can be readily replaced. After the wool has been removed from the rod 8 the operator removes the disk from the upper end of said rod and replaces the cap 6 on the lower end of the vertical pipe. After the wool has been washed the operator removes the cap 6 from the top of said pipe and replaces the wool and after it has been replaced, replaces the disk on the upper end of the rod and replaces the cap, and the vertical pipe is ready for use. For cleaning the pipe the same operation is performed. When it is desired to clean the vertical pipes 4 and 5 the operator closes the stop cock 24 and the stop cock 31 and opens the stop cocks 21 and 37. When this is done and water is forced into the pipe 2 through the inlet pipe 20 it will be forced out through the pipe 33 which leads to the outlet pipe 29, thus cutting the water supply off from the vertical pipes 4 and 5. To clean these the same operation is performed as to clean the pipes 2 and 3.

I am aware that prior to my invention a series of filters have been connected in pairs and in series, so as to be disconnected singly or in pairs or used in series, and I therefore do not claim such broadly as of my invention. Nor do I broadly claim a filter in which a vertical pipe or rod is secured at its upper end to the head or cap of such filter and is provided with perforated disks for supporting the filtering material.

What I claim is—

An improved filter, comprising four separate pipes 2, 3, 4 and 5, filtering-material in said pipes, a short pipe 12 connecting two of said pipes 2 and 3 at the upper ends thereof to form one pair, a short pipe 16 connecting the remaining two of said pipes 4 and 5 to form another pair, short pipes 13, 14 connecting contiguous pipes 3 and 4 of different pairs at a point adjacent their lower ends, a stop-cock 15 connected to said short pipes 13, 14 between said pairs, so that communication between them may be cut off or established at will, pipes connected to the lower portions of all four of said pipes 2, 3, 4, and 5 to supply and discharge liquid to and from the lower portions only of either pair separately, and proper connections, substantially as herein specified.

In testimony whereof I affix my signature in presence of two witnesses.

AVERY L. EMERY.

Witnesses:
W. J. SANKEY,
EDWARD EVERETT LONGAN.